US005567873A

United States Patent [19]

Toyoda

[11] Patent Number: 5,567,873
[45] Date of Patent: Oct. 22, 1996

[54] MISFIRE-DETERMINING CONTROLLER FOR INTERNAL COMBUSTION ENGINE

[75] Inventor: Katsuhiko Toyoda, Shizuoka-ken, Japan

[73] Assignee: Suzuki Motor Corporation, Hamamatsu, Japan

[21] Appl. No.: 386,694

[22] Filed: Feb. 10, 1995

[30] Foreign Application Priority Data

Apr. 28, 1994 [JP] Japan ................................. 6-113837

[51] Int. Cl.⁶ ................................................ G01M 15/00
[52] U.S. Cl. ............................................ 73/117.3; 123/419
[58] Field of Search ................................... 73/116, 117.3, 73/117.2, 118.2; 123/419, 436; 364/431.07, 431.08

[56] References Cited

U.S. PATENT DOCUMENTS

| 5,027,779 | 7/1991 | Nishiyama | 123/491 |
|---|---|---|---|
| 5,125,381 | 6/1992 | Nutton et al. | 123/425 |
| 5,168,859 | 12/1992 | Ohsaki | 73/116 |
| 5,226,322 | 7/1993 | Armitage | 73/116 |
| 5,231,869 | 8/1993 | Klenk et al. | 73/116 |
| 5,241,937 | 9/1993 | Kanehiro et al. | 123/425 |
| 5,263,453 | 11/1993 | Wakahara et al. | 73/117.3 |
| 5,287,737 | 2/1994 | Osawa et al. | 73/117.3 |
| 5,299,548 | 4/1994 | Beall | 123/586 |
| 5,333,585 | 8/1994 | Kuroda | 123/339 |
| 5,337,716 | 8/1994 | Fukui et al. | 123/425 |
| 5,357,790 | 10/1994 | Hosoya | 73/117.3 |
| 5,361,629 | 11/1994 | McCombie | 73/117.3 |
| 5,375,462 | 12/1994 | Kuroda et al. | 73/117.3 |
| 5,394,330 | 2/1995 | Horner | 73/116 |
| 5,425,339 | 6/1995 | Fukui | 123/416 |
| 5,447,061 | 9/1995 | Fujiki | 73/117.3 |
| 5,447,137 | 9/1995 | Asano et al. | 123/436 |

FOREIGN PATENT DOCUMENTS 5-202801  8/1993  Japan .

*Primary Examiner*—Richard Chilcot
*Assistant Examiner*—Eric S. McCall
*Attorney, Agent, or Firm*—Flynn, Thiel, Boutell & Tanis, P.C.

[57] ABSTRACT

A misfire-determining controller comprises a control which is provided with the added function of controlling so as to cease misfire monitoring when at least one misfire detection-ceasing conditions is true, which misfire detection-ceasing conditions including: ignition timing being under adjustment; throttle-bypassing air being under adjustment; an ISC valve flow rate being under adjustment; a fuel feedback correction amount being under adjustment; an abnormality being present in a fuel system; and a fuel failure.

7 Claims, 3 Drawing Sheets

MISFIRE-DETERMINING CONTROLLER FOR INTERNAL COMBUSTION ENGINE

FIELD OF THE INVENTION

This invention relates to a misfire-determining controller for an internal combustion engine. More particularly, it relates to an improved misfire-determining controller for an internal combustion engine which, before executing misfire monitoring, determines whether none of preestablished, misfire detection-ceasing conditions are met, whereby it is easy to pinpoint the cause of a misfire at the time of misfire determination.

BACKGROUND OF THE INVENTION

Among conventional internal combustion engines, there is one type of engine which operates with a lean mixture, or achieves what is called lean combustion. This system reduces the occurrence of harmful components in exhaust gases while increasing a fuel efficiency.

However, an excessively lean mixture is likely to generate a misfire because such a lean mixture causes a failure of combustion in a combustion chamber, from which unburned gases flow toward an air-discharging system. The resulting misfire is a factor contributing to the degradation or failure of the function of a catalyst body and the like. The misfire is also a factor contributing to air pollution as a result of the unburned gases being discharged in the air. For such reasons, a fuse sensor is positioned on a downstream side of the catalyst body. The fuse sensor detects a temperature state of the catalyst body when the misfire elevates the temperature of the catalyst body above a predetermined value. At this time, a meter appears, or a warning lamp on a panel turns on, so as to signal a vehicle driver that the misfire has occurred.

Published Japanese Patent Application Laid-Open No. 5-202801 discloses a misfire-determining controller for the aforesaid internal combustion engine. The misfire-determining controller taught by this publication determines an output level of an air-fuel ratio-detecting means, whereby an after-the-sale service engineer can easily diagnose the cause of a misfire in a particular cylinder when inspecting a misfired vehicle. That is, the service technician does not need to check all of the causes of misfires in both fuel injection and ignition systems for each cylinder. In this way, the controller is designed to provide fewer inspection man-hours and less inspection time.

In conventional misfire-determining controllers for internal combustion engines, there are cases where the engine is misjudged to be misfired although the engine normally runs without experiencing any misfire. The misjudgment turns on a lamp, which brings about an inconvenience in that a vehicle driver experiences a feeling of uneasiness and unnecessary confusion as well.

In addition, when the internal combustion engine is used under various situations, misfires may be detected as a result of other causes in spite of the engine being in normal operation.

Such misfires are detected, for example, in the event of: a fuel failure or what is called a gas-free state; a failure of an ISC valve; the presence of an abnormality in a fuel system; or, vehicular adjustment which includes ignition timing, an ISC valve flow rate, a fuel feedback (F/B) correction amount, bypassing air, and the like.

As a result, when misfire determination is made according to conventional misfire monitoring, it is judged as a result of the aforementioned various causes that the engine is in a misfired state. In this case, there are inconveniences, which are disadvantageous in view of practical use, in that the cause of the misfire is difficult to trace, and that additional working time and man-hours are required for locating the cause of the misfire.

In order to obviate the above-described inconveniences, the present invention provides a misfire-determining controller for an internal combustion engine, including a control means which controls so as to execute misfire monitoring for determining a misfire on the basis of variations in an operating state of the internal combustion engine, comprising the improvement wherein the control means is provided with the added function of controlling so as to cease the misfire monitoring when at least one of cases of misfire detection-ceasing conditions is met, the misfire detection-ceasing conditions including the cases of: ignition timing being under adjustment; throttle-bypassing air being under adjustment; an ISC valve flow rate being under adjustment; a fuel feedback correction amount being under adjustment; an abnormality being present in a fuel system; and a fuel failure.

According to the present invention having the above structure, when one of the cases of the misfire detection-ceasing conditions is true, the control means ceases the misfire monitoring. When none of the cases of the misfire detection-ceasing conditions are met, it follows that the control means eliminates the misfire detection-ceasing conditions which cause the misfire. This feature facilitates the tracing of the cause of the misfire at the time of misfire determination, and provides less working time and fewer working man-hours.

BRIEF DESCRIPTION OF THE DRAWINGS

An embodiment of the present invention will now be described in detail with reference to the drawings, wherein.

DETAILED DESCRIPTION

Figure 3:
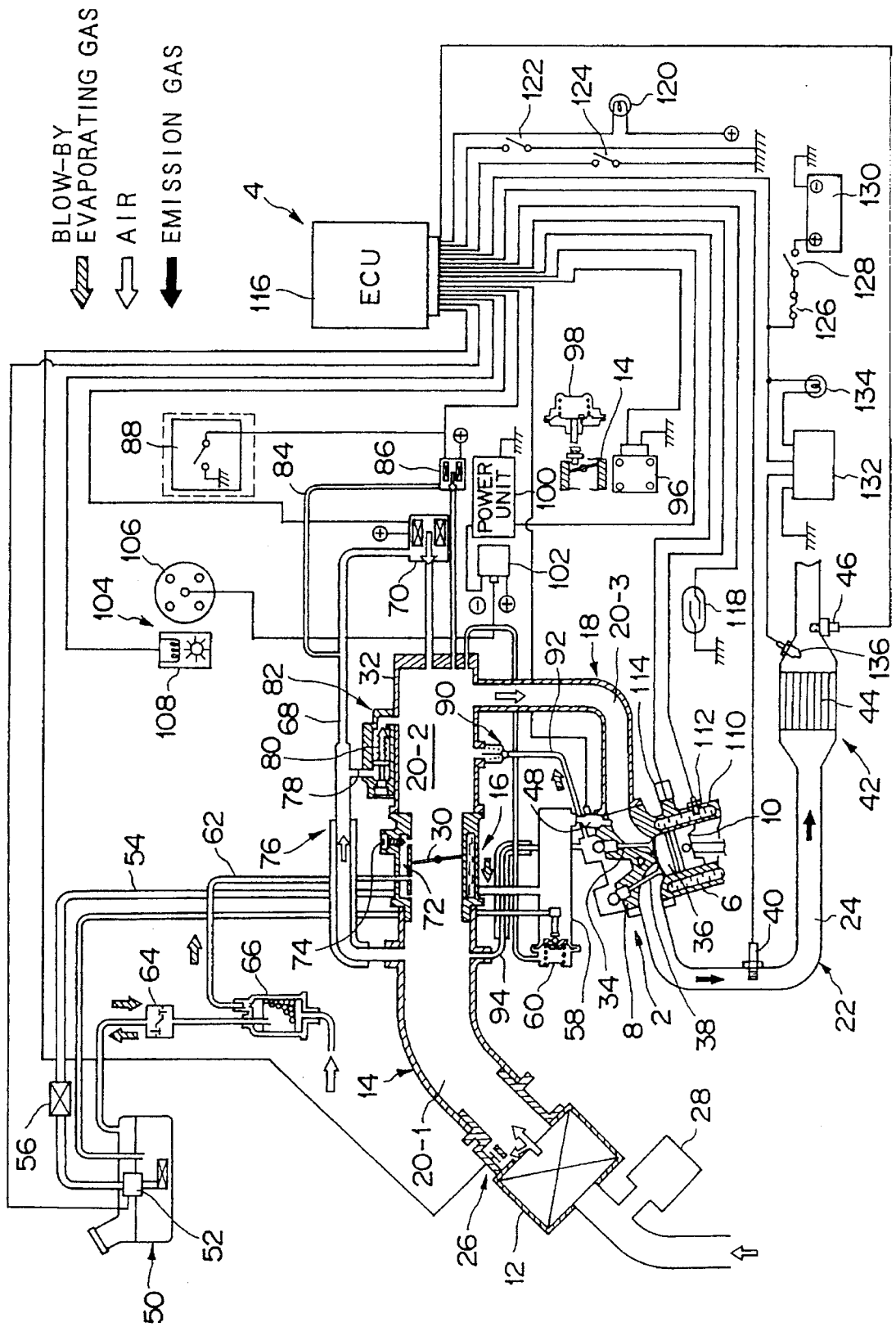
FIG. 3 is a schematic view illustrating how the misfire-determining controller is constructed in the internal combustion engine.

In FIG. 3, reference numeral 2 denotes an internal combustion engine of a fuel injection control type; 4 a misfire-determining controller; 6 a cylinder block; 8 a cylinder head; 10 a piston; 12 an air cleaner; 14 an air intake pipe; 16 a throttle body; 18 an intake manifold; 20 an air intake passage; 22 an air exhaust pipe; and 24 an air exhaust passage.

The air intake pipe 14 is provided between the air cleaner 12 and the throttle body 16, thereby forming a first intake passage 20-1. The air intake pipe 14 has an air flow meter 26 positioned on an upstream side thereof. The air flow meter 26 measures an inducted air quantity.

A resonator 28 for reducing the sound of inlet air is located on an upstream side of the air cleaner 12. A second intake passage 20-2 is defined by the throttle body 16 so as to communicate with the first intake passage 20-1. The second intake passage 20-2 has an intake air throttle valve 30 positioned therein. The second intake passage 20-2 communicates with a third intake passage 20-3 via a surge tank 32. The third intake passage 20-3 is formed by the intake manifold 18. A downstream side of the third intake passage 20-3 communicates with a combustion chamber 36 of the internal combustion engine 2 through an air intake valve 34. The combustion chamber 36 communicates with the air exhaust passage 24 through an air exhaust valve 38.

The air exhaust pipe 22 is provided with a front oxygen sensor 40 and a catalyst body 44. These components 40 and 44 are arranged in turn from the side of the internal combustion engine 2. The front oxygen sensor 40 is a first air-fuel ratio sensor which is provided with a heater. The catalyst body 44 forms a part of a catalytic converter 42. The front oxygen sensor 40 is located in the air exhaust passage 24 on an upstream side of the catalyst body 44. The front oxygen sensor 40 detects a concentration of oxygen in exhaust emissions which are present inside the air exhaust passage 24 on the upstream side of the catalyst body 44. The front oxygen sensor 40 generates a signal indicating the detection.

The air exhaust pipe 22 is further provided with a rear oxygen sensor 46 on a downstream side of the catalyst body 44. The rear oxygen sensor 46 is a second air-fuel ratio sensor having a heater. The rear oxygen sensor 46 detects a concentration of oxygen in exhaust gases which are present inside the air exhaust passage 24 on the downstream side of the catalyst body 44. The rear oxygen sensor 46 generates a signal indicative of the detection.

A fuel injection valve 48 is operatively attached at a location where the intake manifold 18 and the cylinder head 8 are connected together. The fuel injection valve 48 is oriented toward the combustion chamber 36.

Fuel in a fuel tank 50 is fed under pressure to the fuel injection valve 48. More specifically, the fuel in the tank 50 is pumped under pressure into a fuel supply passage 54 by a fuel pump 52. The fuel is filtered through a fuel filter 56. The filtered fuel is led into a fuel distribution pipe 58 in which pressure exerted on the fuel is adjusted to a given level by a fuel pressure regulator 60. The pressure-regulated fuel is then delivered to the fuel injection valve 48.

There is an evaporating fuel passage 62 whose one end communicates with an upper portion inside of the fuel tank 50. The other end of the evaporating fuel passage 62 communicates with the second intake passage 20-2 of the throttle body 16. Further, a two-way valve 64 and a canister 66 are provided midway along the evaporating fuel passage 62. These two components 64 and 66 are arranged in sequence from the side of the fuel tank 50.

In order to intercommunicate the first intake passage 20-1 and the inside of the surge tank 32, an idle-bypassing air passage 68 is provided for bypassing the intake air throttle valve 30. The idle-bypassing air passage 68 is used for throttle-bypassing air. An idle rotational speed control valve (an ISC valve) 70 is positioned midway along the idle-bypassing air passage 68. This control valve 70 opens and closes the idle-bypassing air passage 68 in order to regulate an air quantity during idle operation.

Further, the throttle body 16 is provided with an auxiliary-bypassing air passage 72 which bypasses the intake air throttle valve 30. The auxiliary passage 72 is opened and closed by an auxiliary-bypassing air quantity regulator 74.

An idle rotational speed controller 76 is formed by: the idle-bypassing air passage 68; the idle rotational speed control valve 70; the auxiliary-bypassing air passage 72; and the auxiliary-bypassing air quantity regulator 74.

The idle rotational speed controller 76 executes feedback control over an idle rotational speed of the internal combustion engine 2 to a target idle rotational speed by means of the idle rotational speed control valve 70. Further, the idle rotational speed controller 76 regulates the aforesaid target idle rotational speed by means of the auxiliary-bypassing air quantity regulator 74. The regulator 74 is located in the auxiliary-bypassing air passage 72 which is used for throttle-bypassing air. The auxiliary-bypassing air passage 72 bypasses the intake air throttle valve 30, and intercommunicates the first intake passage 20-1 and the inside of the surge tank 32.

An air passage 78 is located midway along the idle-bypassing air passage 68. The air passage 78 is branched off from the idle-bypassing air passage 68, and opens into the surge tank 32. The air passage 78 is provided with an air valve 80 which operates with the temperature and the like of engine cooling water. The air passage 78 and the air valve 80 form an air regulator 82.

Further, a power steering air passage 84 is positioned midway along the idle-bypassing air passage 68. The power steering air passage 84 is branched off from the idle-bypassing air passage 68, and is in communication with the inside of the surge tank 32. A power steering control valve 86 is provided midway along the power steering air passage 84. The power steering control valve 86 is operated and controlled by a power steering switch 88.

Although blow-by gases are generated in the internal combustion engine 2, the engine 2 has first and second blow-by gas return passages 92 and 94 intercommunicated at the cylinder head 8 in order to return the blow-by gases to an air suction system of the engine 2. The first blow-by gas return passage 92 communicates with a PCV valve 90 which is mounted on the surge tank 32. The second blow-by gas return passage 94 opens into the first intake passage 20-1.

The air intake pipe 14 is provided with a throttle sensor 96 and a dashpot 98. The throttle sensor 96 detects a state in which the intake air throttle valve 30 is opened. The throttle sensor 96 also functions as an idle switch. The dashpot 98 prevents rapid closing of the intake air throttle valve 30.

An ignition coil 102 communicates with a power unit 100 and a distributor 106. The distributor 106 constitutes an ignition mechanism 104.

The internal combustion engine 2 is further provided with a crank angle sensor 108. The crank angle sensor 108 detects a crank angle of the engine 2, and also serves as an engine speed sensor.

The internal combustion engine 2 is additionally provided with a water temperature sensor 112 and a knocking sensor 114, both of which are located on the cylinder block 6. The water temperature sensor 112 detects the temperature of engine cooling water inside a cooling water passage 110. The cooling water passage 110 is defined in the cylinder block 6. The knocking sensor 114 detects a knocking state of the internal combustion engine 2.

A control means (an engine control unit or ECU) 116 communicates with: the air flow meter 26; the front oxygen sensor 40; the rear oxygen sensor 46; the fuel injection valve 48; the fuel pump 52; the idle rotational speed control valve 70; the power steering control valve 86 and the power steering switch 88; the throttle sensor 96; the power unit 100; the crank angle sensor 108; the water temperature sensor 112; and the knocking sensor 114.

The control means 116 further communicates with: a vehicle velocity sensor 118; a diagnostic lamp 120; a diagnostic switch 122; a test switch 124; a battery 130 via a fuse 126 and a main switch 128; and a warning lamp 134 via an alarm relay 132. The alarm relay 132 communicates with, e.g., a thermosensor 136 which detects an exhaust temperature inside the air exhaust passage 24 on a downstream side of the catalyst body 44.

The control means 116, for example, receives various detection signals. The control means 116 effects feedback (F/B) control of an air-fuel ratio in accordance with the detection signals from the front and rear oxygen sensors 40 and 46. At the same time, the control means 116 functions to determine the deterioration of the catalyst body 44 when predetermined catalyst deterioration-determining conditions are fulfilled.

Further, the control means 116 has the function of controlling so as to execute misfire monitoring; the misfire monitoring determines a misfire on the basis of variations in a running state of the internal combustion engine 2. In addition, the control means 116 has the added function of controlling so as to cease the misfire monitoring when at least one of the cases of misfire detection-ceasing conditions is met. The misfire detection-ceasing conditions include the cases of: ignition timing being under adjustment; throttle-bypassing air being under adjustment; the ISC valve flow rate being under adjustment; a fuel feedback correction amount being under adjustment; an abnormality being present in a fuel system; and a fuel failure.

In greater detail, the misfire detection-ceasing conditions under the control of the control means 116 fall into six cases as follows:

(1) ignition timing is under adjustment:

(When a test terminal is, for example, switched on, the ignition timing assumes a fixed ignition state, thereby ceasing idle stabilization-intended ignition timing control for stabilizing an idling state.);

(2) throttle-bypassing air is under adjustment:

(The bypassing air represents a basic airflow rate for deciding an idle rotational speed. In some cases, the ISC valve flow rate, the fuel feedback correction amount, and the ignition timing are all rendered fixed, thereby performing the above adjustment.);

(3) ISC valve flow rate is under adjustment:

(Although this adjustment varies from type to type, there is a method for regulating an engine rotational speed by establishing the ISC valve flow rate at a fixed value.);

(4) fuel feedback correction amount is under adjustment:

(Although this adjustment varies from type to type, there is a method for controlling an air-fuel ratio to $\lambda=1$ by interrupting the fuel feedback correction amount.);

(5) an abnormality is present in a fuel system; and (6) fuel failure:

(This is what is called a gas-free state in which a level of fuel falls below a predetermined value.).

In this way, the control means 116 incorporates the misfire detection-ceasing conditions therein which are formed by the aforesaid six cases, whereby the control means 116 executes control so as to stop misfire monitoring when one of the above cases of the misfire detection-ceasing conditions holds true. Therefore, this system precludes a judgement on the above six cases-caused misfire.

Figure 1:
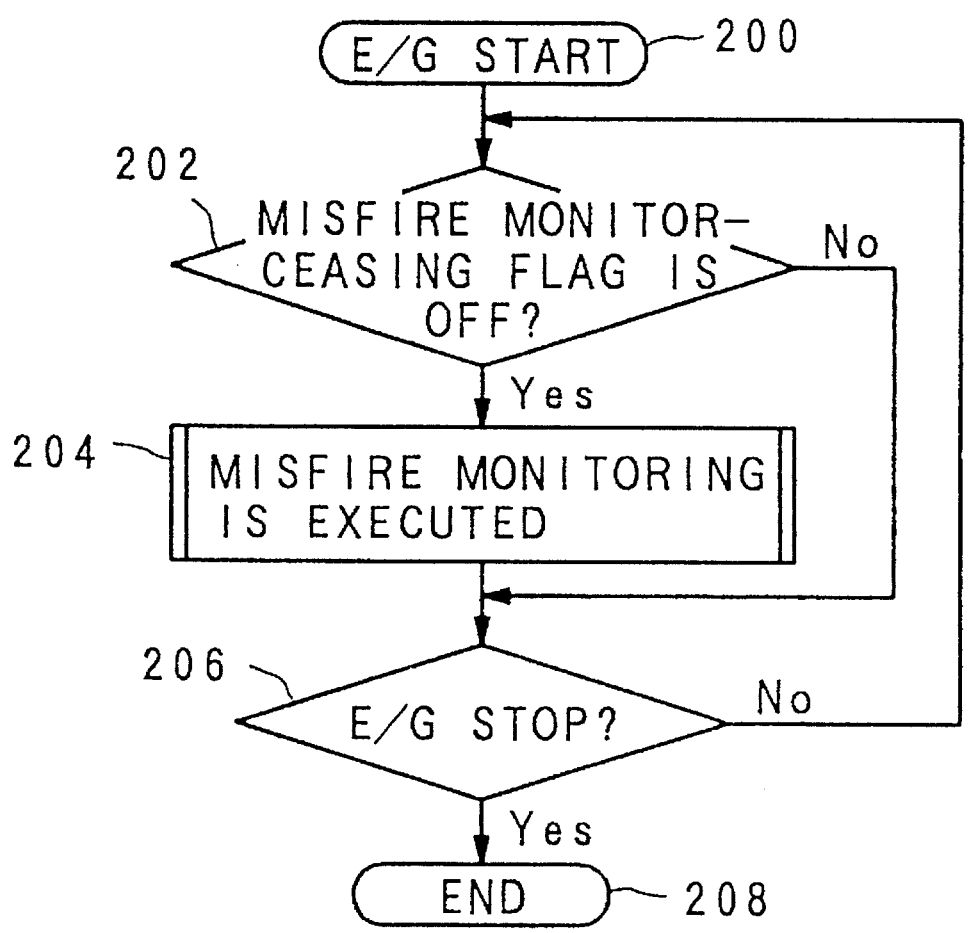
FIG. 1 is a flow chart for controlling a misfire-determining controller for an internal combustion engine according to an embodiment of the present invention.

Next, the operation of the present invention will be described with reference to a control flow chart of FIG. 1.

When the internal combustion engine (E/G) 2 is actuated, a control program starts with step 200.

The program is advanced to step 202 at which determination is made as to whether a misfire monitor-ceasing flag is off. When the determination in step 202 is "YES" the program is advanced to step 204 at which misfire monitoring is executed. Then, the program is shifted to step 206 at which determination is made as to whether the engine (E/G) 2 remains out of operation. Referring back to step 202, when the determination in this step is "NO", the program is shifted directly to aforesaid step 206.

When the determination in step 206 is "NO", i.e., when the engine (E/G) 2 is being driven, the program is returned to aforesaid step 202. When the determination in step 206 is "YES", the control program is forced to end at step 208.

As detailed hereinbelow, the misfire monitoring is stopped when the misfire monitor-ceasing flag is on.

Figure 2:
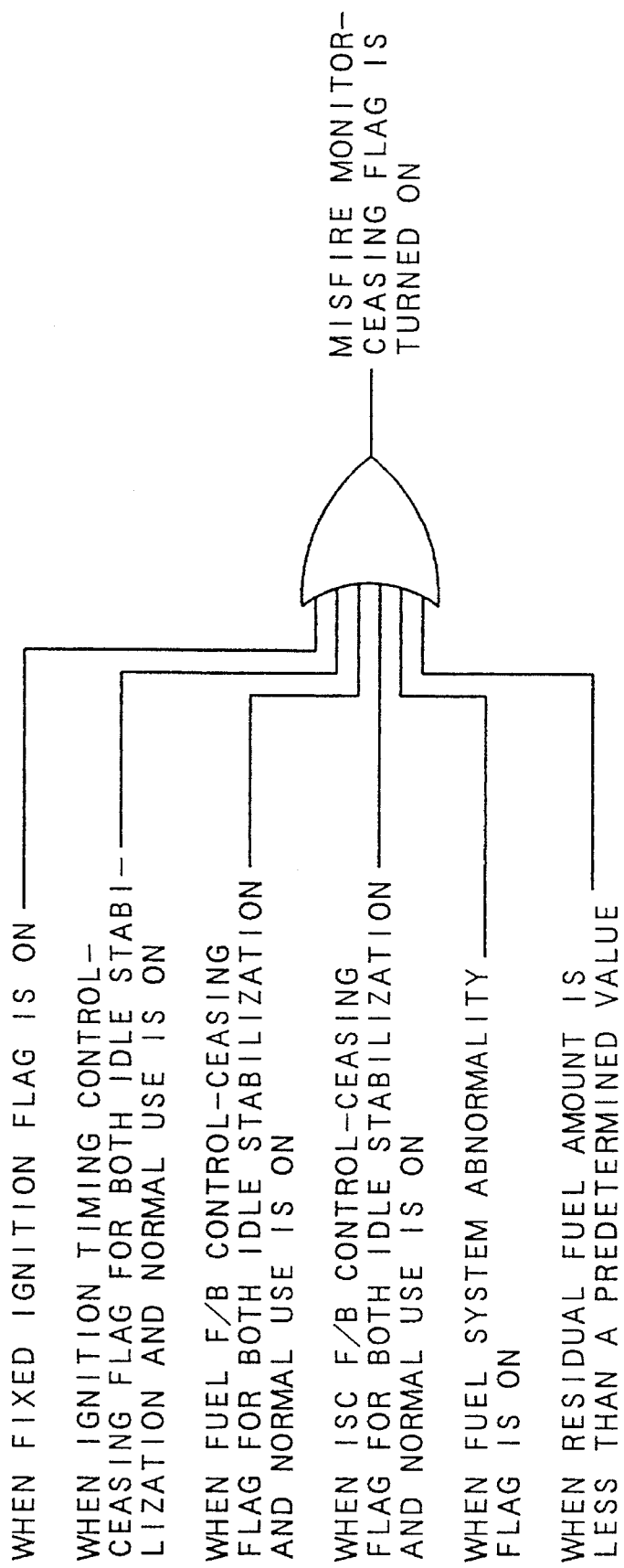
FIG. 2 is a diagram showing a theoretical form which includes six cases of misfire detection-ceasing conditions.

That is, the misfire monitoring is ceased when one of the following cases holds true, as shown in FIG. 2: when a fixed ignition flag is on; when an ignition timing control-ceasing flag for both idle stabilization and normal use is on; when a fuel feedback (F/B) control-ceasing flag for both idle stabilization and normal use is on; when an ISC feedback (F/B) control-ceasing flag for both idle stabilization and normal use is on; when a fuel system abnormality flag is on; and when a residual fuel amount is less than a predetermined value.

In this way, the control means 116 is provided with the added function of controlling so as to cease the misfire monitoring when one of the cases of the misfire detection-ceasing conditions is met. The control means 116 thereby eliminates the misfire detection-ceasing conditions which conventionally cause misfiring. This feature makes for easy pinpointing of the cause of the misfire when determination is made as to the misfire. As a result, it is possible to provide less working time and fewer working man-hours. This is advantageous in view of practical use.

Furthermore, as previously described, the misfire monitor-ceasing flag is switched on when one of the following cases is true: when the fixed ignition flag is on; when the aforesaid ignition timing control-ceasing flag is on; when the aforesaid fuel feedback (F/B) control-ceasing flag is on; when the aforesaid ISC feedback (F/B) control-ceasing flag is on; when the fuel system abnormality flag is on; and when a residual fuel amount is less than a predetermined value. The misfire monitoring is thereby, precluded from being executed. As a result, when the misfire is determined, the cause of the misfire is easily traced without the likelihood of unnecessary confusion being involved.

Moreover, the use of various sensors, which have already been installed, allows the entire operation to be managed through only a change in the content of the program of the control means 116. This feature provides an uncomplicated structure, which is easy to fabricate and which is possible to maintain low cost. This is advantageous from an economical viewpoint.

It should be understood that the present invention is not limited to the above embodiment, but is intended to cover various applications and changes or modifications.

For example, according to this embodiment of the present invention, the following six cases are incorporated into the control means as the misfire detection-ceasing conditions:

(1) ignition timing being under adjustment;

(2) throttle-bypassing air being under adjustment;

(3) an ISC valve flow rate being under adjustment;

(4) a fuel feedback correction amount being under adjustment;

(5) an abnormality being present in a fuel system; and (6) a fuel failure.

Then, the control means incorporating the above cases therein determines whether or not the misfire monitoring is executed.

Instead of being used as the conditions for ceasing the misfire monitoring, the above cases can also be employed as conditions for ceasing the respective monitoring of: fuel system; catalyst deterioration; and oxygen sensor abnormality determination. Accordingly, such ceasing conditions are eliminated before the above respective monitoring is executed, thereby facilitating the locating of the cause of the misfire at the time of each determination. As a result, unnecessary confusion can be avoided. This is advantageous in view of practical use.

As amplified in the above description, according to the present inventions, the control means is provided with the added function of controlling so as to cease the misfire monitoring when at least one of cases of the misfire detection-ceasing conditions holds true. The misfire detection-ceasing conditions include the cases of: ignition timing being under adjustment; throttle-bypassing air being under adjustment; an ISC valve flow rate being under adjustment; a fuel feedback correction amount being under adjustment; an abnormality being present in a fuel system; and a fuel failure. The control means thereby excludes the misfire detection-ceasing conditions which cause the misfire. This feature makes it easy to pinpoint the cause of the misfire at the time of misfire determination. As a result, it is possible to provide less working time and fewer working man-hours. This is advantageous in view of practical use.

Moreover, the use of various sensors, which have already been installed, allows the entire operation to be managed through only a change in the content of the program of the control means. This feature provides an uncomplicated structure, which is easy to fabricate and which is possible to maintain low cost. This is advantageous from an economical viewpoint.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An electronic control system for controlling the operation of an internal combustion engine, the engine having a combustion chamber, an air intake line connected to the combustion chamber through which air flows into the combustion chamber, an adjustable throttle disposed in the air intake line for controlling the air flow through the air intake line, an idle bypass assembly connected to said air intake line around the throttle for providing a throttle-bypass air flow path around the throttle, the idle bypass assembly having a regulator that allows the throttle-bypass air flow to be selectively adjusted, and a fuel delivery system for supplying vaporized fuel to the combustion chamber, said system including;

a plurality of sensors mounted to the internal combustion engine for monitoring the operation of the engine, said sensors being configured to generate sensor signals representative of operating conditions of the engine including an air flow sensor configured to monitor the air flow through the air intake line;

an idle state control (ISC) valve attached to said idle bypass assembly for regulating the air flow through the idle bypass assembly, said ISC valve adjusting the throttle-bypass air flow through the idle bypass line in response to an ISC valve signal wherein said ISC valve operates independently of the regulator of the idle bypass assembly; and an electronic control unit connected to said sensors including said air flow sensor for receiving said sensor signals and to said ISC valve, said electronic control unit being configured to monitor the operation of the engine based on said received sensor signals including whether or not the regulator of the idle bypass assembly is being adjusted in order to adjust the throttle-bypass air flow and to control the operation the engine based on said monitoring, said engine control including generating said ISC valve signal to adjust the position of said ISC valve, said monitoring including detecting engine misfires based on said received sensor signals the inhibiting of said misfire wherein said electronic control unit is configured to inhibit the detection of engine misfires when the throttle-bypass air flow is being adjusted or when said ISC valve is being adjusted.

2. The electronic engine control system of claim 1, further including:

an electrically controlled fuel injection system located between the fuel delivery system and the combustion chamber for regulating the amount of fuel supplied to the combustion chamber, said fuel injection system being configured to deliver a selected amount of fuel to the combustion chamber in response to a fuel injection signal; and said electronic control unit is connected to said fuel injection system and is further configured to generate said fuel injection signal to selectively adjust the fuel supplied to the combustion chamber as part of said engine operation control and to inhibit said detection of engine misfires when the combustion chamber fuel supply is being adjusted.

3. The electronic engine control system of claim 1, further including:

an ignition timer connected to said combustion chamber for regulating combustion of the fuel and the air in the combustion chamber, said ignition timer being configured to regulate the fuel and air combustion in response to receipt of an ignition timing signal; and said electronic control unit is connected to said ignition timer and is further configured to generate said ignition timing signal to selectively adjust when the combustion of the fuel and air occurs in the combustion chamber combustion as part of said engine operation control and to inhibit said detection of engine misfires when the timing of the combustion of the fuel and air is being adjusted.

4. The electronic engine control system of claim 1, wherein:

at least one said sensor is connected to the engine fuel delivery system for monitoring the delivery of fuel to the combustion chamber, said at least one sensor being configured to generate a fuel abnormality signal when there is an irregularity in the fuel flow to the combustion chamber; and said electronic control unit is connect to receive said fuel abnormality signal and said electronic control unit is further configured to inhibit said detection of engine misfires when said fuel abnormality signal is received.

5. The electronic engine control system of claim 4, wherein said at least one sensor connected to the fuel delivery system is configured to generate said fuel abnormality signal when the fuel delivery system has less than a predetermined amount of fuel.

6. The electronic engine control system of claim 4, further including:

an electrically controlled fuel injection system located between the fuel delivery system and the combustion chamber for regulating the amount of fuel supplied to the combustion chamber, said fuel injection system being configured to deliver a selected amount of fuel to the combustion chamber in response to a fuel injection signal; and said electronic control unit is connected to said fuel injection system and is further configured to generate said fuel injection signal to selectively adjust the fuel supplied to the combustion chamber as part of said engine operation control and to inhibit said detections of engine misfires when the combustion chamber fuel supply is being adjusted.

7. The electronic engine control system of claim 6, further including:

an ignition timer connected to said combustion chamber for regulating the combustion of the fuel and air in the combustion chamber, said ignition timer being configured to regulate when the fuel and air combustion occurs in response to receipt of an ignition timing signal; and said electronic control unit is connected to said ignition timer and is further configured to generate said ignition timing signal to selectively adjust the timing of the fuel and air combustion in the combustion chamber as part of said engine operation control and to inhibit said misfire monitoring when the timing of the fuel and air combustion is being adjusted.

* * * * *

UNITED STATES PATENT AND TRADEMARK OFFICE
CERTIFICATE OF CORRECTION

PATENT NO. : 5 567 873
DATED : October 22, 1996
INVENTOR(S) : Katsuhiko Toyoda

It is certified that error appears in the above-indentified patent and that said Letters Patent is hereby corrected as shown below:

Column 8, line 15; delete "the inhibiting of said misfire".

Signed and Sealed this

Fourth Day of March, 1997

Attest:

BRUCE LEHMAN

Attesting Officer

Commissioner of Patents and Trademarks